United States Patent
Lee (10) Patent No.: US 7,792,638 B2
(45) Date of Patent: Sep. 7, 2010

(54) METHOD OF LOADING 3-D IMAGE DATA (75) Inventor: Jae Ok Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 12/331,543

(22) Filed: Dec. 10, 2008

(65) Prior Publication Data
US 2009/0157313 A1 Jun. 18, 2009

(30) Foreign Application Priority Data
Dec. 17, 2007 (KR) .................. 10-2007-0132656

(51) Int. Cl.
*G01C 21/30* (2006.01)
(52) U.S. Cl. ..................................... 701/211
(58) Field of Classification Search ......... 701/208–211; 345/419, 428, 601, 626, 629
See application file for complete search history.

(56) References Cited

U.S. PATENT DOCUMENTS

| 5,956,039 | A | * | 9/1999 | Woods et al. ............... 345/419 |
| 6,191,793 | B1 | * | 2/2001 | Piazza et al. ................ 345/582 |
| 6,429,873 | B1 | * | 8/2002 | Kacevas et al. ............. 345/587 |
| 2005/0171754 | A1 | * | 8/2005 | Santodomingo et al. ...... 703/21 |

\* cited by examiner

*Primary Examiner*—Kim T Nguyen
(74) *Attorney, Agent, or Firm*—Edwards Angell Palmer & Dodge LLP; Peter F. Corless (57) ABSTRACT

The present invention relates to a method of loading 3-D image data in a navigation system. In the method, whether a vehicle enters an intersection while traveling is determined. A mask array based on a travel path of the vehicle is selected. An object to be displayed at the intersection is selected and a level-of-detail array of the object is selected according to a distance between the vehicle and the object. The level-of-detail array of the object overlaps the mask array. The object is displayed according to a level of detail of the object obtained from the level-of-detail array overlapping the mask array. According to the method, real-time 3-D image data can be loaded in a simple and efficient manner.

9 Claims, 10 Drawing Sheets

FIG. 1A

PRIOR ART

FIG. 1B

PRIOR ART

FIG. 2

PRIOR ART

METHOD OF LOADING 3-D IMAGE DATA

CROSS-REFERENCE TO RELATED APPLICATIONS

This application claims under 35 U.S.C. §119(a) priority to Korean Application No. 10-2007-0132656, filed on Dec. 17, 2007, the disclosure of which is incorporated herein by reference in its entirety.

BACKGROUND

1. Technical Field

The present invention relates, in general, to a method of loading data, and, more particularly, to a method of loading data about three-dimensional (3-D) images for a navigation system.

2. Related Art

A typical navigation system guides a driver in a suitable traveling direction when an intersection (a fork in the road) appears ahead a vehicle the driver is driving. Here, the driver can be guided by, for example, a visual information display device, an audio information providing device, or both. The display device may display information in an enlarged view.

Figure 1A:
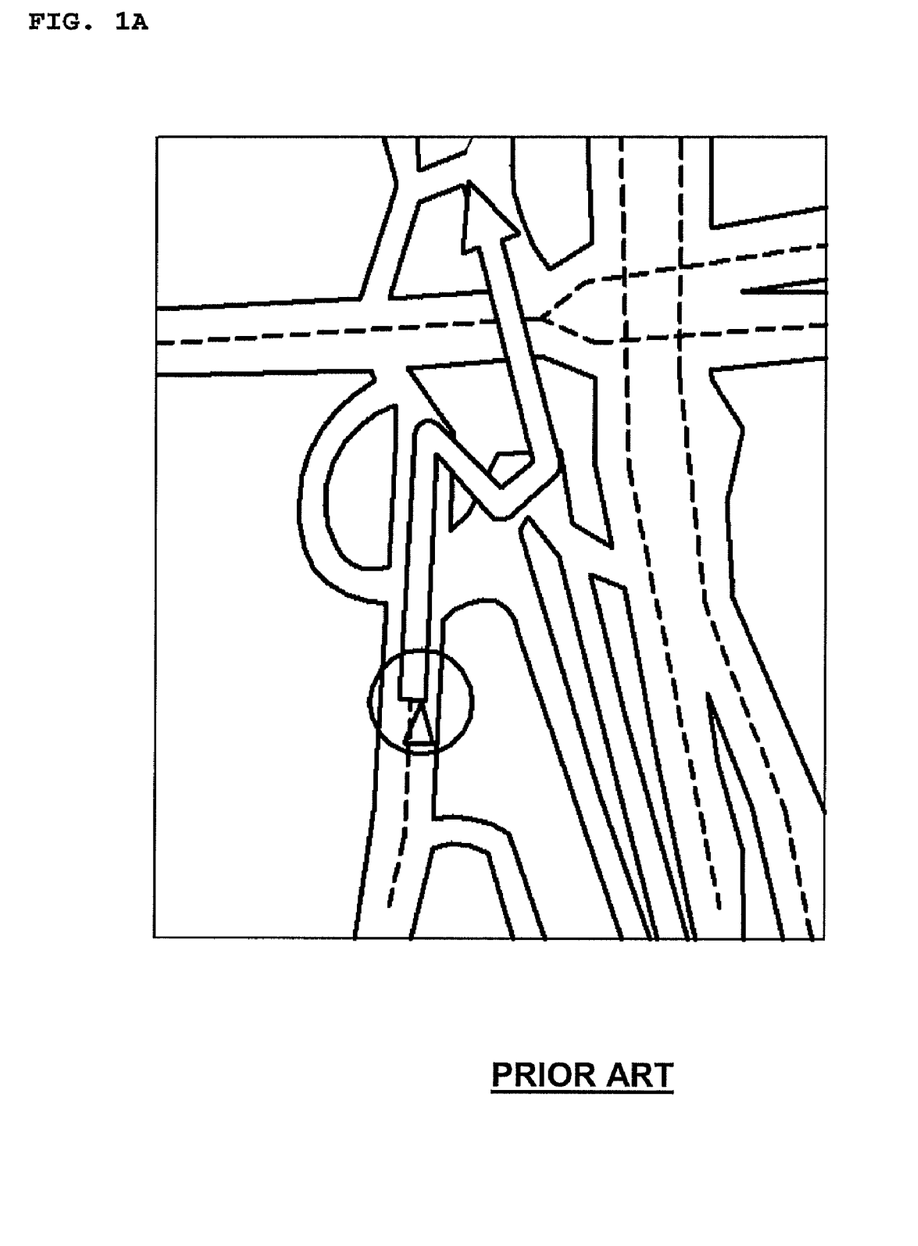
FIGS. 1A to 1B are diagrams showing examples of enlarged views of an intersection displayed in a conventional navigation system.
Figure 1B:
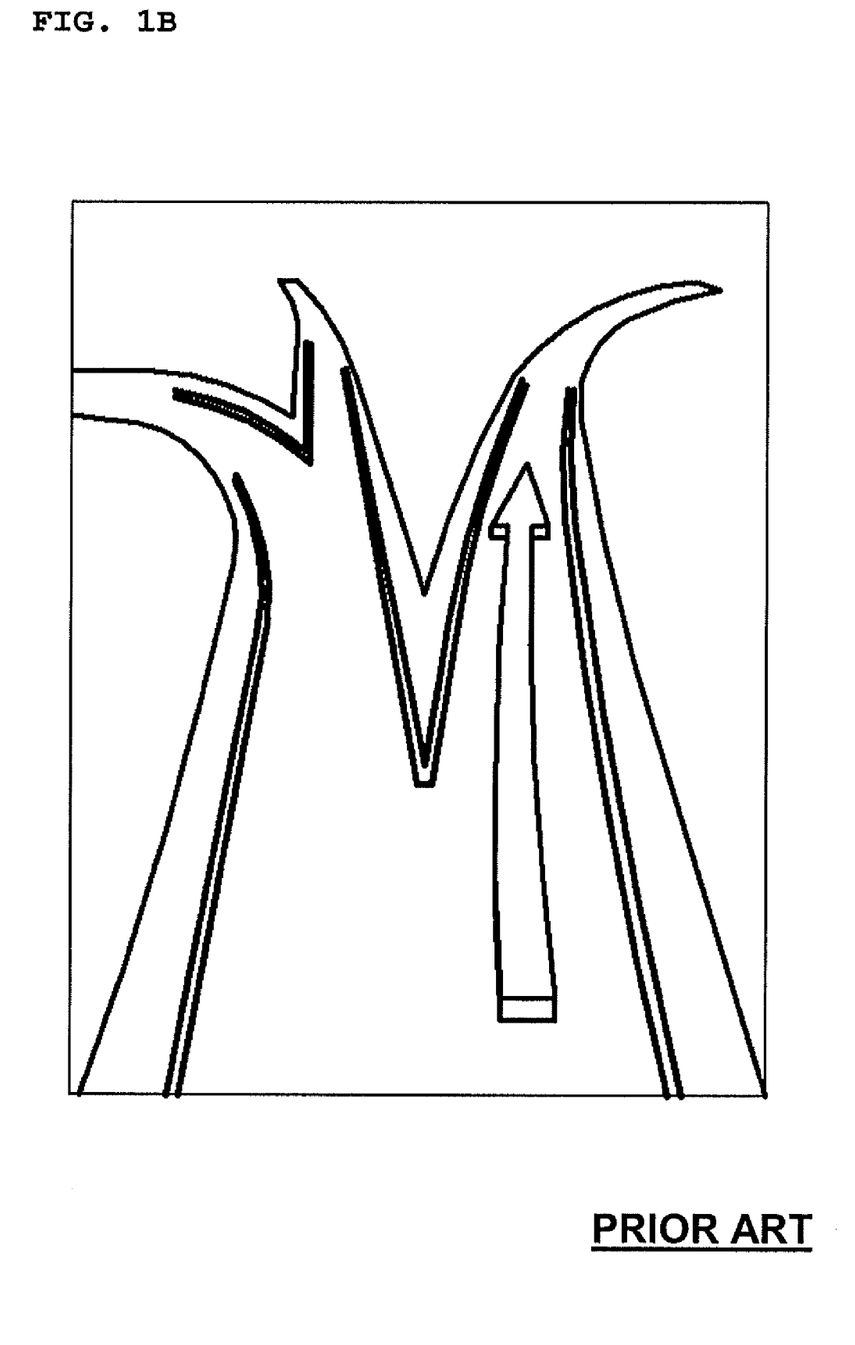

FIGS. 1A to 1B are diagrams showing examples of enlarged views of an intersection displayed in a conventional navigation system. Referring to FIGS. 1A and 1B , the enlarged views of the intersection are shown by merely magnifying a digital map, as shown in FIG. 1A, outputting a separately prepared road pattern image, as shown in FIG. 1B.

However, such display examples are problematic in that the information about the intersection or other roads is presented in a non-realistic look and in two dimensions.

Figure 2:
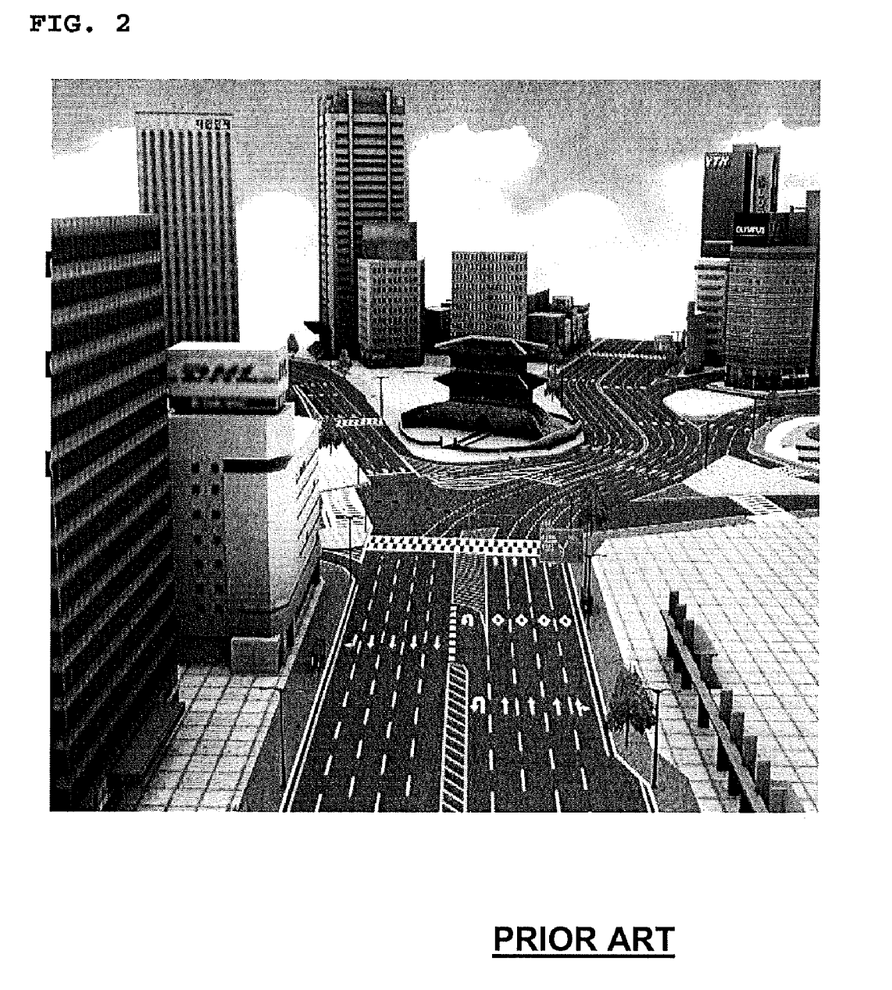
FIG. 2 is a diagram showing an example of the display of a 3-D image of an intersection in a navigation system.

Accordingly, technology for displaying road information as a 3-D image has been proposed with the development of technology for navigation systems in terms of hardware and software. FIG. 2 is a diagram showing an example of the display of a 3-D image of an intersection. Referring to FIG. 2, 3-D image data is convenient for drivers in that the information presented to the drivers is realistic.

Nonetheless, outputting the 3-D image stably requires processing a large size of data in a short time. That is, in practice, if the data processing speed decreases, the time taken to load required data increases, thus making it difficult to load real-time 3-D image data about geographic features, geographic objects, and roadways (hereinafter referred to as 'objects'), unless an expensive high-performance hardware is provided.

One method was proposed to solve this problem, in which 3-D image objects are prioritized and loading only objects having a priority above a predetermined priority. However, prioritizing all objects imposes a great burden on the system.

The above information disclosed in this Background section is only for enhancement of understanding of the background of the invention and therefore it may contain information that does not form the prior art that is already known in this country to a person of ordinary skill in the art.

SUMMARY

Accordingly, the present invention has been made keeping in mind the above problems occurring in the prior art, and an object of the present invention is to provide a method of loading real-time 3-D image data in a simple and efficient way.

In order to accomplish the above object, one aspect of the present invention provides a method of loading 3-D image data in a navigation system, comprising determining whether a vehicle enters an intersection while traveling; selecting a mask array based on a travel path of the vehicle; selecting an object to be displayed at the intersection and selecting a level-of-detail array of the object according to a distance between the vehicle and the object; overlapping the level-of-detail array of the object with the mask array; and displaying the object according to a level of detail of the object obtained from the overlapped arrays.

Preferably, the method may further comprise updating information about the object to be displayed according to variation in a distance between the object and the vehicle such that the level of detail can be updated accordingly.

Suitably, the level-of-detail array may be included in a header of data about the object.

Preferably, the level of detail of the object may be obtained by 'AND' operation on the mask array overlapped with the level-of-detail array.

Preferably, the level-of-detail array may be provided differently according to the distance between the vehicle and the object.

Suitably, the mask array and the level-of-detail array each may have a row for indicating an index for a road located in a direction in which the vehicle enters the intersection and a column for indicating an index for a road located in a direction in which the vehicle leaves the intersection.

In this case, the mask array may, suitably, be implemented such that a value of '1' is recorded in a cell corresponding to an index for a road located in a travel direction of the vehicle at the intersection, among cells of the mask array. The level-of-detail array may, preferably, be implemented such that a value corresponding to a level of detail of the object is recorded in a cell corresponding to a travel path along which the vehicle has a possibility of traveling, among cells of the level-of-detail array.

Preferably, each of the cells of the level-of-detail array may be assigned a storage space in which a value obtained by adding 1 to a highest level of detail is stored.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

In order to describe a method of loading 3-dimensional (3-D) image data according to embodiments of the present invention, the level of detail used herein the present invention will be briefly described first.

Geographic features and geographic objects output by a navigation system are called objects, and the embodiments of the present invention will be described on the assumption that respective pieces of 3-D object data are divided into levels of detail (i.e., n levels, where n is a natural number) that indicate levels in which the data is displayed according to distance. For example, when the number of levels of detail is set to five (5), the highest level of detail is the fifth level, and the lowest level of detail is 0th level.

Further, since each piece of 3-D object data includes a header, unique information about an object (for example, the size of object data, the sequence of object data, the level of detail of an object, etc.) may be recorded in the header, and information about the above-described level of detail is included in the header of the 3-D object data.

Reference will now be made in detail to the preferred embodiments of the present invention, examples of which are illustrated in the drawings attached hereinafter, wherein like reference numerals refer to like elements throughout. The embodiments are described below so as to explain the present invention by referring to the figures.

Figure 3:
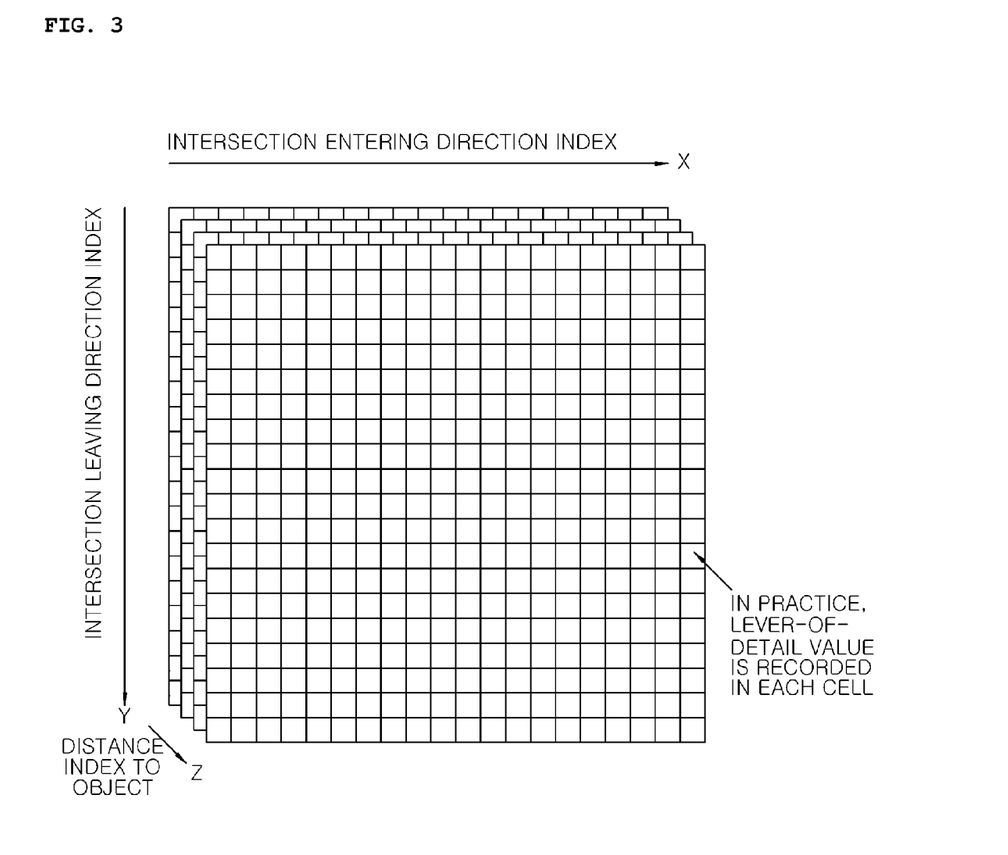
FIG. 3 is a diagram showing the structure of a level-of-detail array assigned to the headers of 3-D object data.

FIG. 3 is a diagram showing the structure of the level-of-detail array assigned to the header of 3-D object data. Referring to FIG. 3, the x axis (column) and the y axis (row) in the level-of-detail array are indices of roads leading to an intersection. That is, respective indices are designated for the roads of the intersection, and information about these indices is intended to be used.

In more detail, the x axis (column) is the index of a road that a vehicle can enter, and the y axis (row) is the index of a road that the vehicle can leave. The maximum number of roads at the intersection can be set to 16, and in this case, the level-of-detail array is an array of 16*16.

However, the meaning of the row and column of the above-described road index can be changed (that is, a row axis may be the index of a leaving road, and a column axis may be the index of an entering road). Further, it will be apparent that the number of entering and outgoing roads and the maximum number of roads at an intersection can be changed within the technical spirit of the present invention.

That is, the level-of-detail array may be regarded as a data storage area in which information about a road located in the direction in which a vehicle is intended to enter an intersection and a road located in the direction in which the vehicle is intended to leave the intersection is stored.

Further, each cell of the level-of-detail array has a storage space in which information corresponding to the highest level of detail +1 can be stored. For example, when the number of levels of detail is set to five (5), the storage space of each cell is assigned 3 bits so that a value corresponding to 6 (i.e., 5+1) can be stored.

Consequently, the level-of-detail value to be loaded is stored in each cell, and values from 0 to 5 can be recorded in the cell. This means the above-described 0th level to fifth level.

If the level of an object is set to the fifth level, it means that the object must be displayed in detail to the vehicle traveling along a given road (entering road and leaving road).

If, on the other hand, the level of an object is set to the 0th level, it means that there is no need to load data and that the object is an object that is not visible from a vehicle traveling along a given road. This will be described in detail later. Accordingly, the problem of unnecessarily loading an object that is actually hidden by a large building or that does not come within the driver's visual field can be solved, and thus the performance of 3-D display of an intersection on the screen can be improved.

Figure 4A:
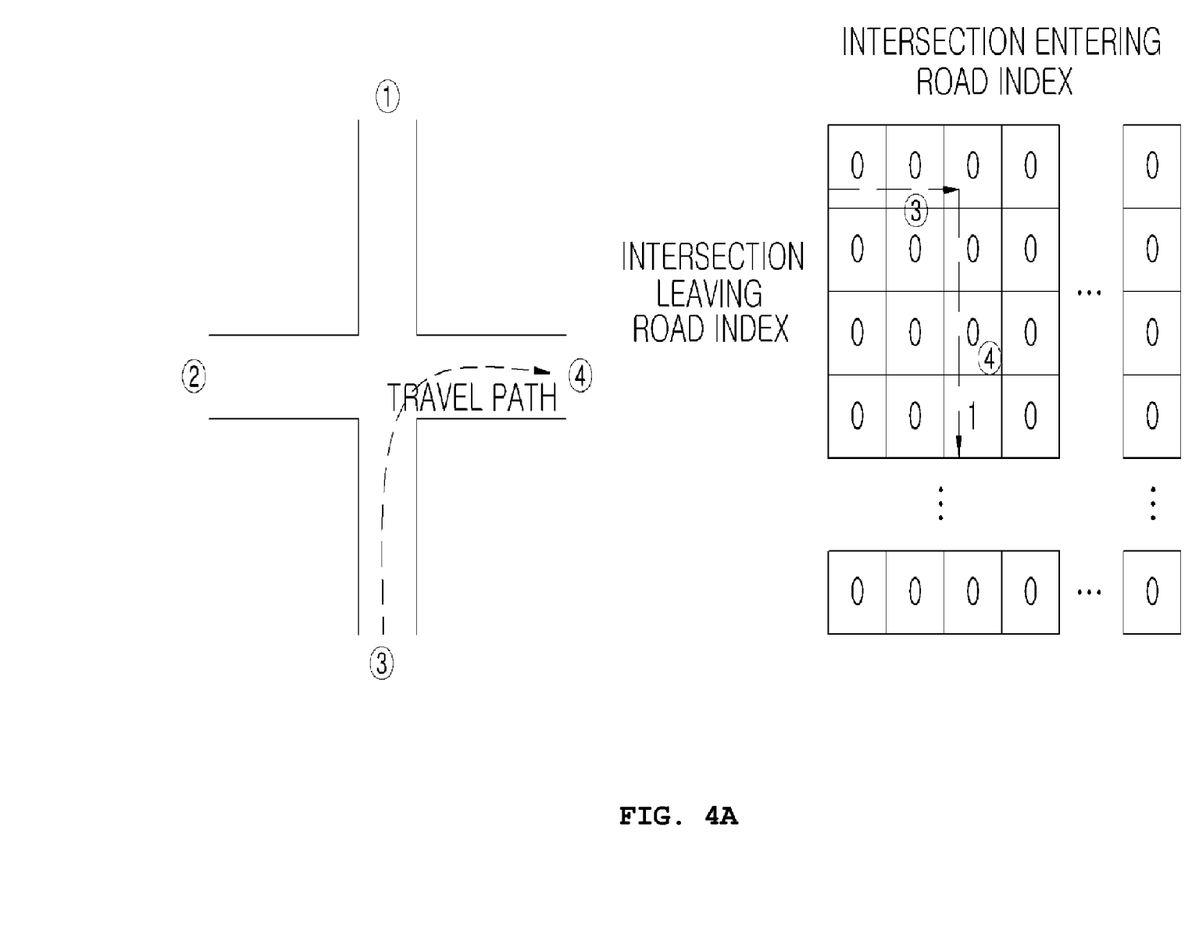
FIG. 4A is a diagram showing a mask array for a vehicle, the travel path of which is designated.

FIG. 4A is a diagram showing a mask array for a vehicle, the travel path of which is designated. When the road that the vehicle will enter is the third road ③, and the road that the vehicle will leave is the fourth road ④, a value of '1' is recorded in a cell in the fourth row and the third column among the cells of the mask array for the vehicle.

Figure 4B:
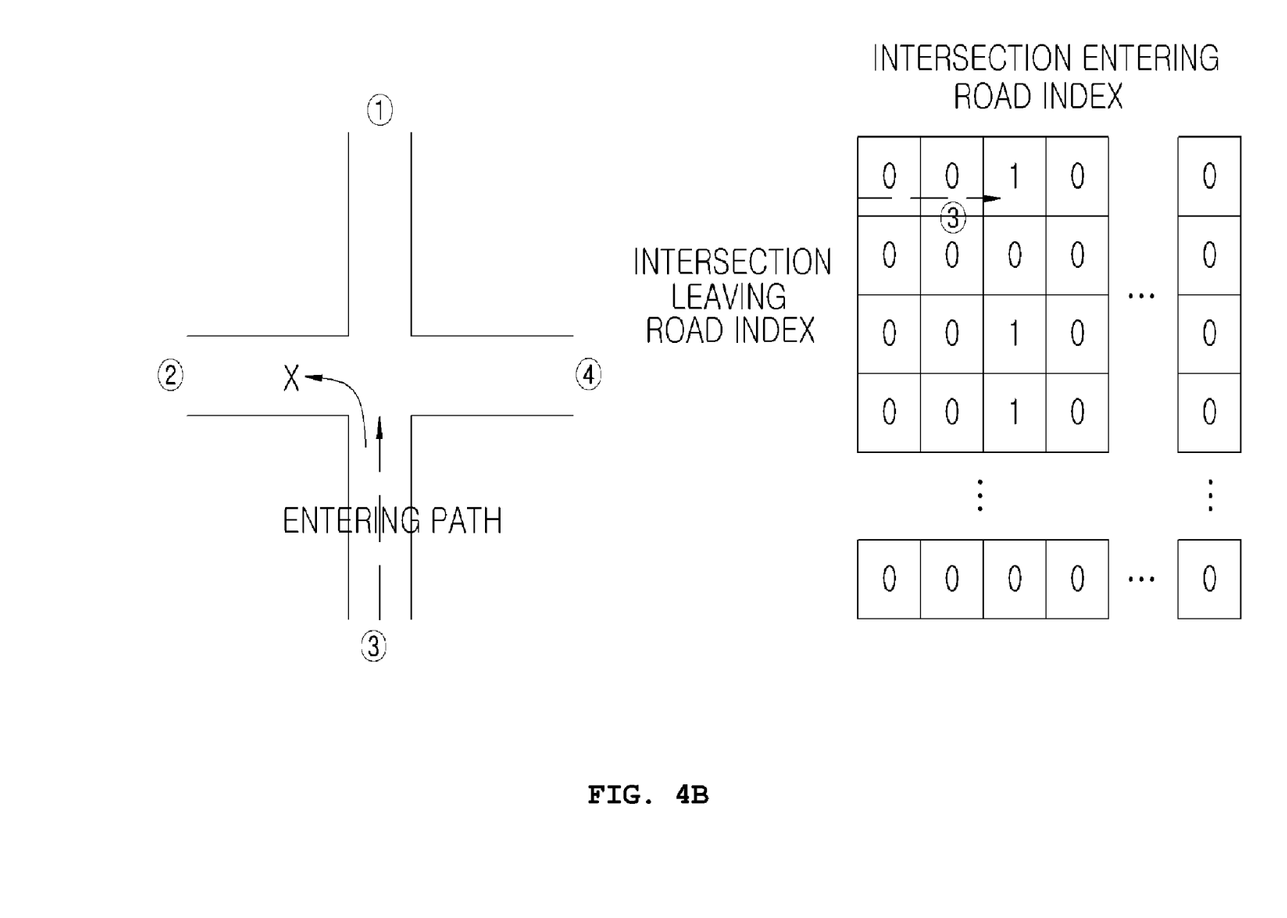
FIG. 4B is a diagram showing a mask array for a vehicle, the travel path of which is not designated.

In contrast, FIG. 4B is a diagram showing a mask array for a vehicle, the travel path of which is not designated. When the road that the vehicle will enter is the third road ③, but the road that the vehicle will leave is not designated, a value of '1' is recorded in a cell in the first row and the third column, a cell in the third row and the third column, and a cell in the fourth row and the third column, but not a cell for the second road ② (it is impossible to leave the second road because it is under construction).

As described above, FIG. 3 illustrates the level-of-detail array of each piece of object data, and FIG. 4A and FIG. 4B illustrate the mask arrays corresponding to the travel paths of a vehicle. When the two arrays are made to overlap each other and an 'AND' operation is performed on respective cells, the level of detail of a given object appears in the cells of the mask array in which '1' is recorded.

Figure 5A:
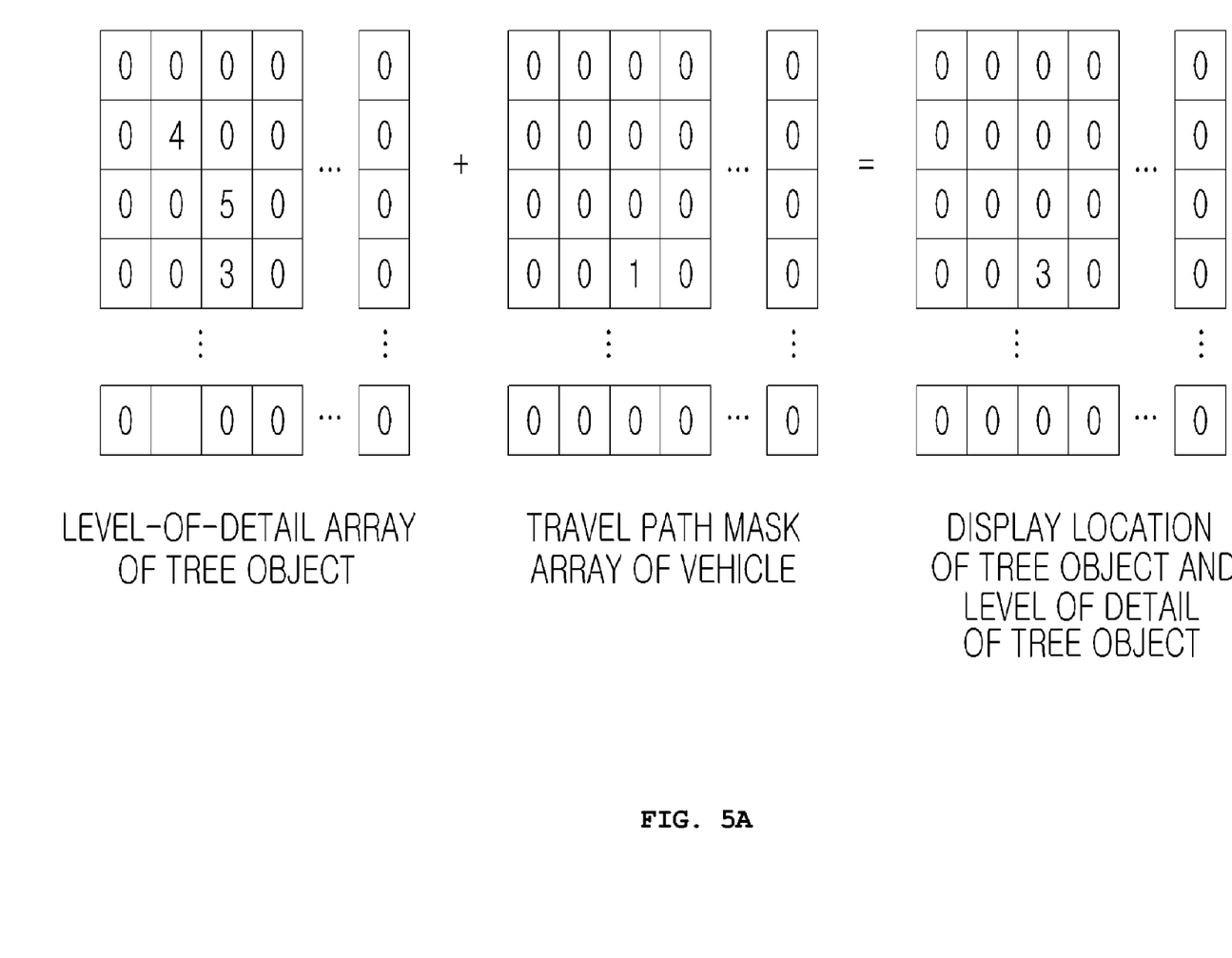
FIG. 5A is a diagram showing a process for performing an 'AND' operation on the level-of-detail array of a tree object and the travel path mask array of a vehicle.
Figure 5B:
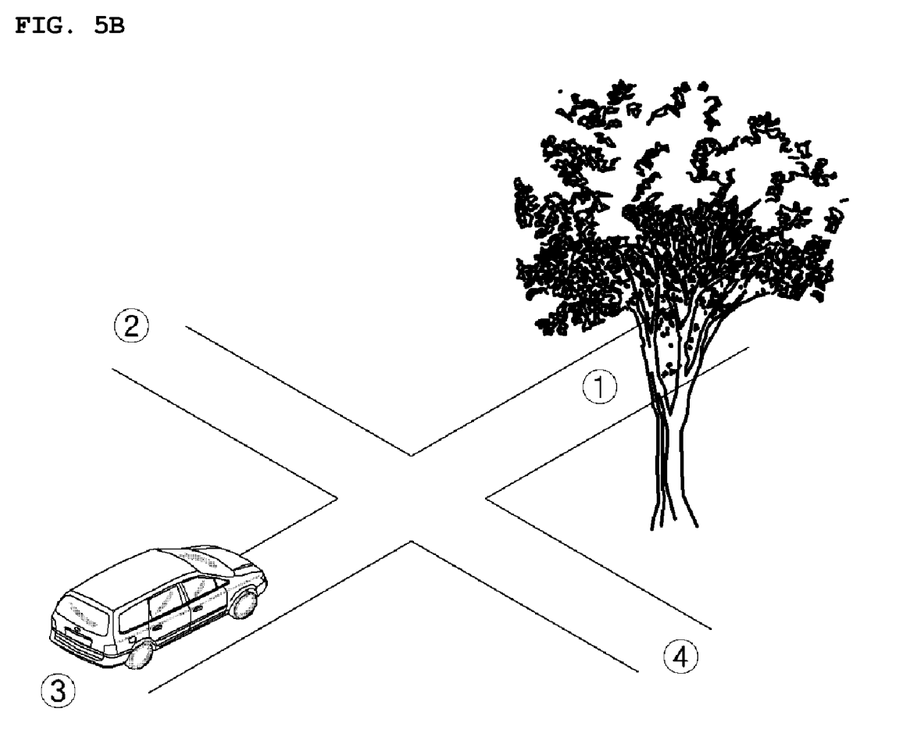
FIG. 5B is a diagram showing an example in which a tree is displayed according to the operation of FIG. 5A.

FIG. 5A is a diagram showing a process for performing an 'AND' operation on the level-of-detail array of a tree object and the travel path mask array of a vehicle, and FIG. 5B is a diagram showing an example in which a tree is displayed according to the operation of FIG. 5A. Referring to FIGS. 5A and 5B, a tree object can be displayed on the screen as the third level of detail, with respect to a vehicle that enters the third road ③ and leaves the fourth road ④.

As the distance between an object and a vehicle varies, the level of detail that is actually displayed also can vary.

Figure 6:
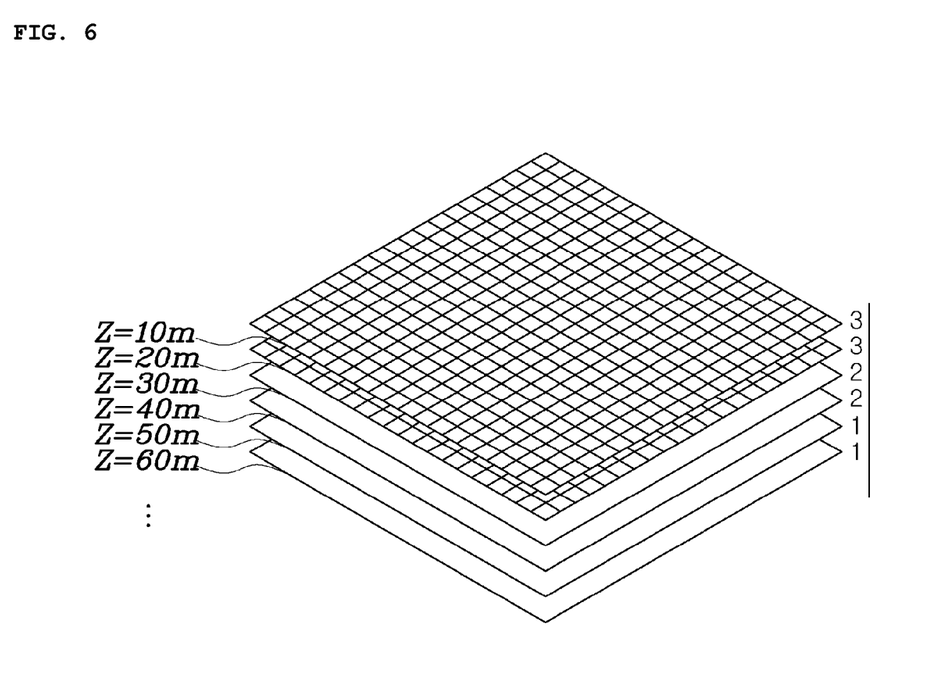
FIG. 6 is a diagram showing variation in the level of detail relative to a distance axis (z axis)

As shown in FIG. 6, the level-of-detail may vary along the z axis according to the distance between the object and the vehicle. In detail, the level-of-detail array for the object can vary at intervals of a certain distance (in FIG. 6, at intervals of 10 m) on the z axis, and the realism of the object can increase as the vehicle approaches the object.

Figure 7:
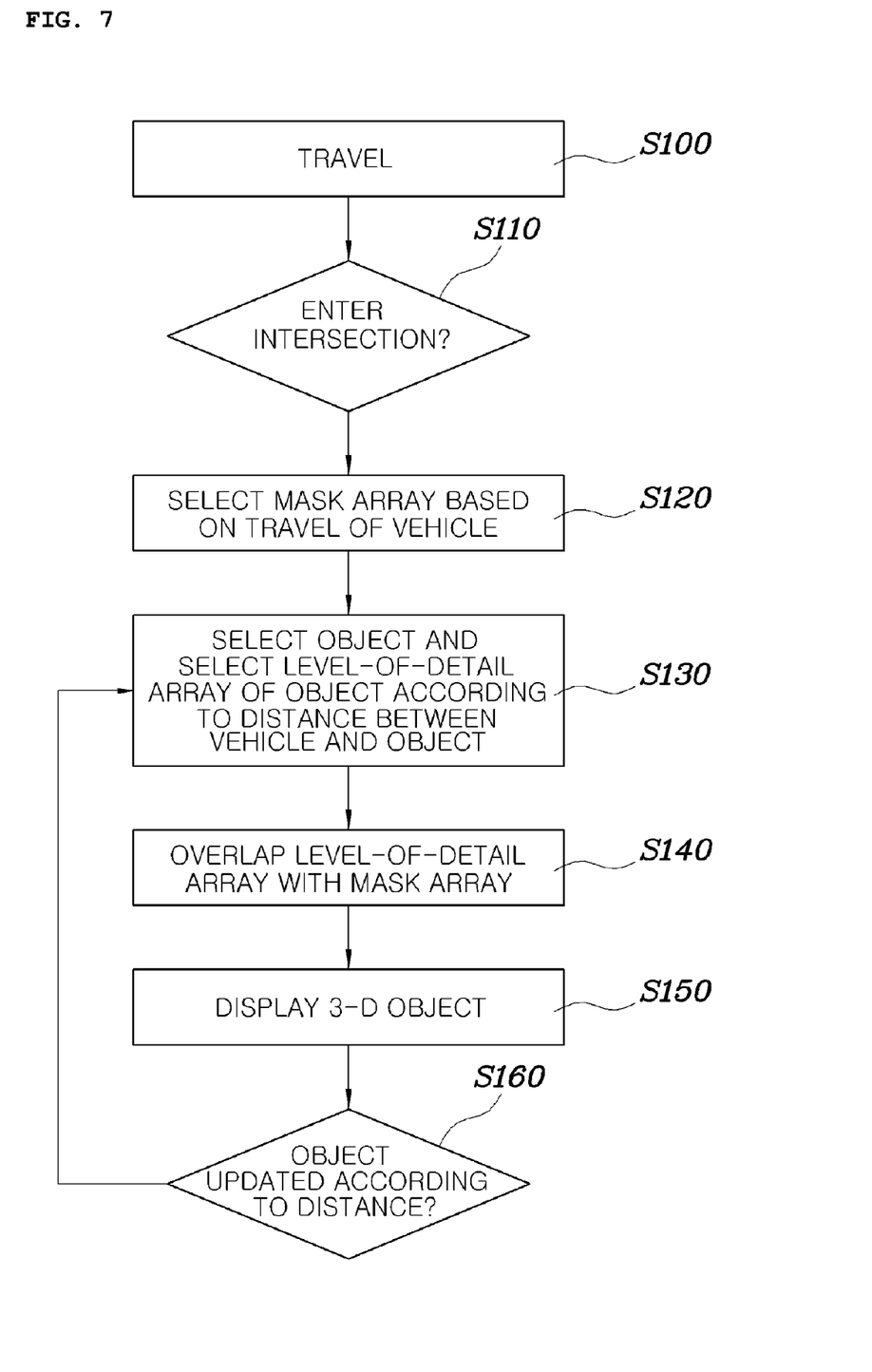
FIG. 7 is a flowchart showing a method of loading 3-D image data in a navigation system using the level of detail of object data at an intersection.

FIG. 7 is a flowchart showing a method of loading 3-D image data in a navigation system using the level of detail of object data described with reference to FIGS. 3 to 6.

Referring to FIG. 7, the method of loading 3-D image data may be performed as follows. It is determined whether a vehicle enters an intersection (S110). If the vehicle is determined to enter the intersection, a mask array based on the travel of the vehicle is selected (S120). An object to be displayed at the intersection and the level-of-detail array of the object according to the distance between the vehicle and the object are selected (S130). The level-of-detail array of the object is overlapped with the mask array (S140). The object is displayed according to the level of detail obtained by, for example, the above-described AND operation with regard to the overlapped arrays (S150).

Preferably, information about the object to be displayed may be updated according to variation in the distance from the vehicle and the level of detail may be updated accordingly (S160).

In this case, an example in which the overlapping operation denotes an 'AND' operation has been described, but it will be apparent that other types of operations can be used.

As described above, the present invention is advantageous in that real-time 3-D image data about geographic features and geographic objects at an intersection or other types of roads can be loaded in a simple and efficient way, thus improving the performance of the navigation system and increasing the convenience of drivers.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of loading three-dimensional (3-D) image data in a navigation system, comprising:
   determining whether a vehicle enters an intersection while traveling;
   selecting a mask array based on a travel path of the vehicle;
   selecting an object to be displayed at the intersection and selecting a level-of-detail array of the object depending on a distance between the vehicle and the object; and
   overlapping the level-of-detail array of the object with the mask array and displaying the object depending on the level of detail of the object obtained from the overlapped arrays.

2. The method according to claim 1, further comprising updating information about the object to be displayed according to variation in a distance between the object and the vehicle such that the level of detail can be updated accordingly.

3. The method according to claim 1, wherein the level-of-detail array is included in a header of data about the object.

4. The method according to claim 1, wherein the level of detail of the object is obtained by 'AND' operation on the mask array overlapped with the level-of-detail array.

5. The method according to claim 1, wherein the level-of-detail array is provided differently according to the distance between the vehicle and the object.

6. The method according to claim 1, wherein the mask array and the level-of-detail array each have a row for indicating an index for a road located in a direction in which the vehicle enters the intersection and a column for indicating an index for a road located in a direction in which the vehicle leaves the intersection.

7. The method according to claim 6, wherein the mask array is implemented such that a value of '1' is recorded in a cell corresponding to an index for a road located in a travel direction of the vehicle at the intersection, among cells of the mask array.

8. The method according to claim 6, wherein the level-of-detail array is implemented such that a value corresponding to a level of detail of the object is recorded in a cell corresponding to a travel path along which the vehicle has a possibility of traveling, among cells of the level-of-detail array.

9. The method according to claim 8, wherein each of the cells of the level-of-detail array is assigned a storage space in which a value obtained by adding 1 to a highest level of detail is stored.

* * * * *